United States Patent
Stoner

[15] 3,653,447
[45] Apr. 4, 1972

[54] LOW SPEED LAWN EDGER

[72] Inventor: John H. Stoner, 425 South 156th St. #129A, Seattle, Wash. 98148

[22] Filed: Jan. 22, 1970

[21] Appl. No.: 4,802

[52] U.S. Cl. ............................................. 172/16, 172/111
[51] Int. Cl. ......................................................... A01b 45/00
[58] Field of Search ................................. 172/13–18, 110, 172/111, 260; 56/16.1–17.6, 249

[56] References Cited

UNITED STATES PATENTS

| | | | |
|---|---|---|---|
| 2,992,689 | 8/1961 | Laughlin | 172/16 |
| 3,150,720 | 9/1964 | Hartnett | 172/16 |
| 3,057,411 | 10/1962 | Carlton | 172/15 |
| 1,641,723 | 9/1927 | Zinn | 37/43 |
| 3,144,745 | 8/1964 | Sharps | 56/249 |
| R25,237 | 9/1962 | Heeren | 172/111 |
| 2,680,945 | 6/1954 | Reed | 172/16 X |
| 2,779,259 | 1/1957 | Kelsey | 172/111 X |
| 3,108,645 | 10/1963 | Hill | 172/111 X |
| 2,847,813 | 8/1958 | Hanson, Jr. et al. | 172/15 |
| 2,484,264 | 10/1949 | Barnes | 172/260 |
| 3,079,743 | 3/1963 | Egley | 172/15 X |
| 1,654,574 | 1/1928 | Brown | 172/15 X |

*Primary Examiner*—Robert E. Pulfrey
*Assistant Examiner*—R. T. Rader
*Attorney*—Seed, Berry & Dowrey

[57] ABSTRACT

A low blade speed rotary edger useful as an independent tool or as an attachment to a conventional power mower includes a (1) cultivator-rotary blade turning on a vertical shaft and (2) a shearing bar contacting the rotary blade. When used as an attachment for a power mower the rotary blade is connected to the power source of the mower by a belt and pulley system or other suitable drive means. The edger assembly mounted on the power mower is provided with means for retracting the edger to an inoperative position when it is not needed.

17 Claims, 9 Drawing Figures

Patented April 4, 1972 3,653,447
3 Sheets-Sheet 1
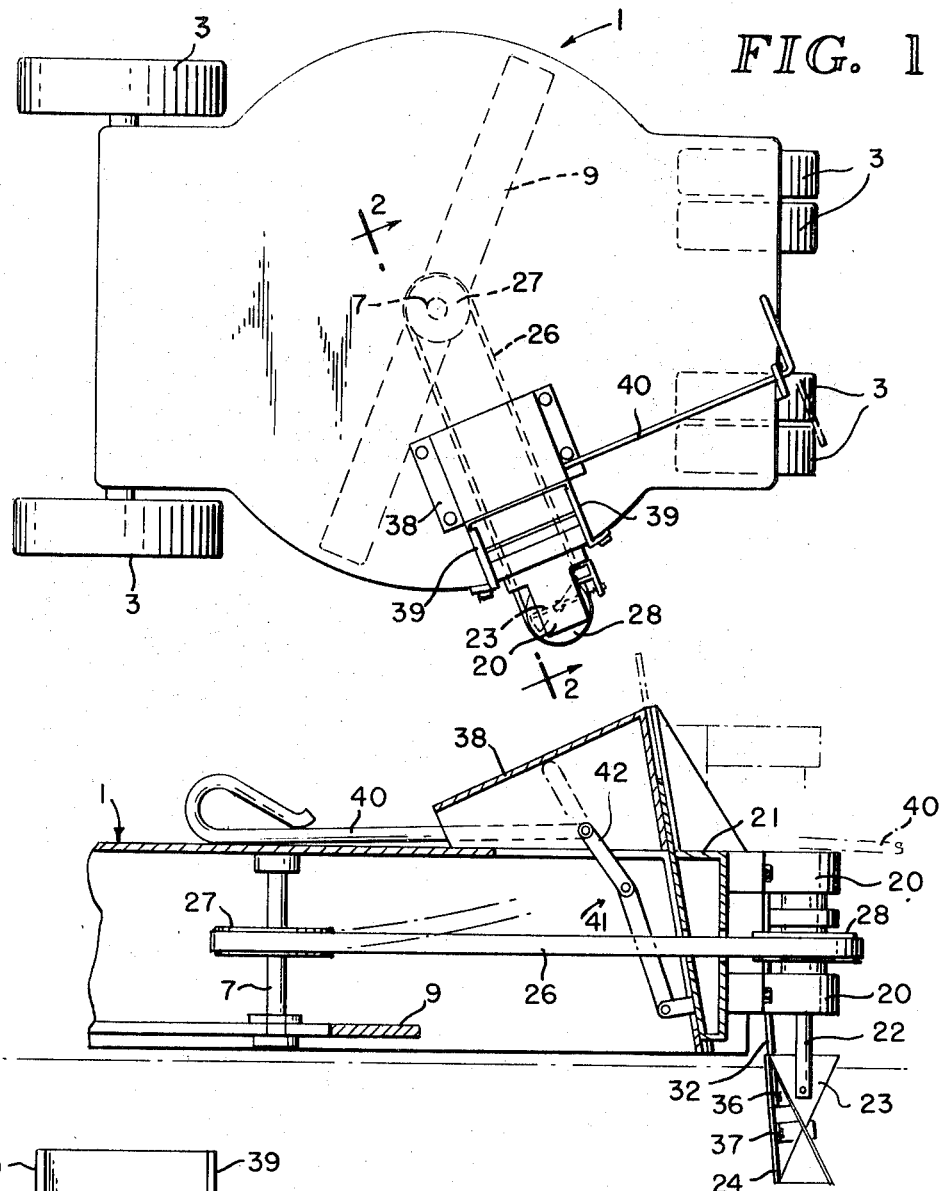
FIG. 1
FIG. 2
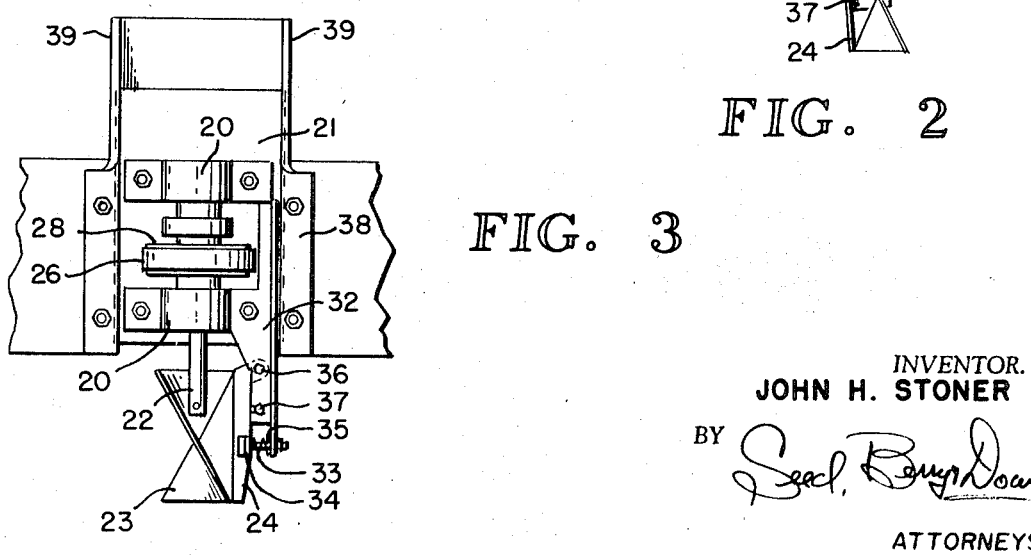
FIG. 3
INVENTOR.
JOHN H. STONER
BY
ATTORNEYS

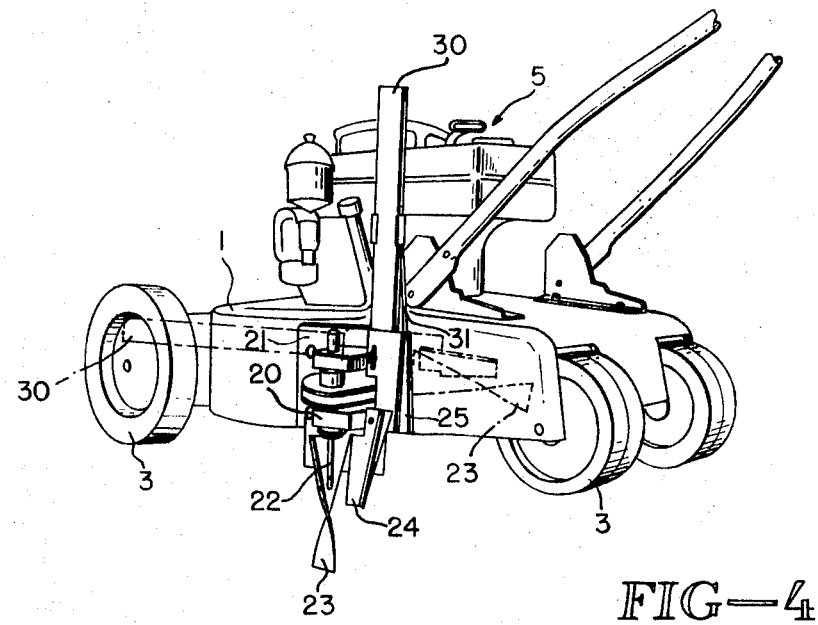
FIG—4
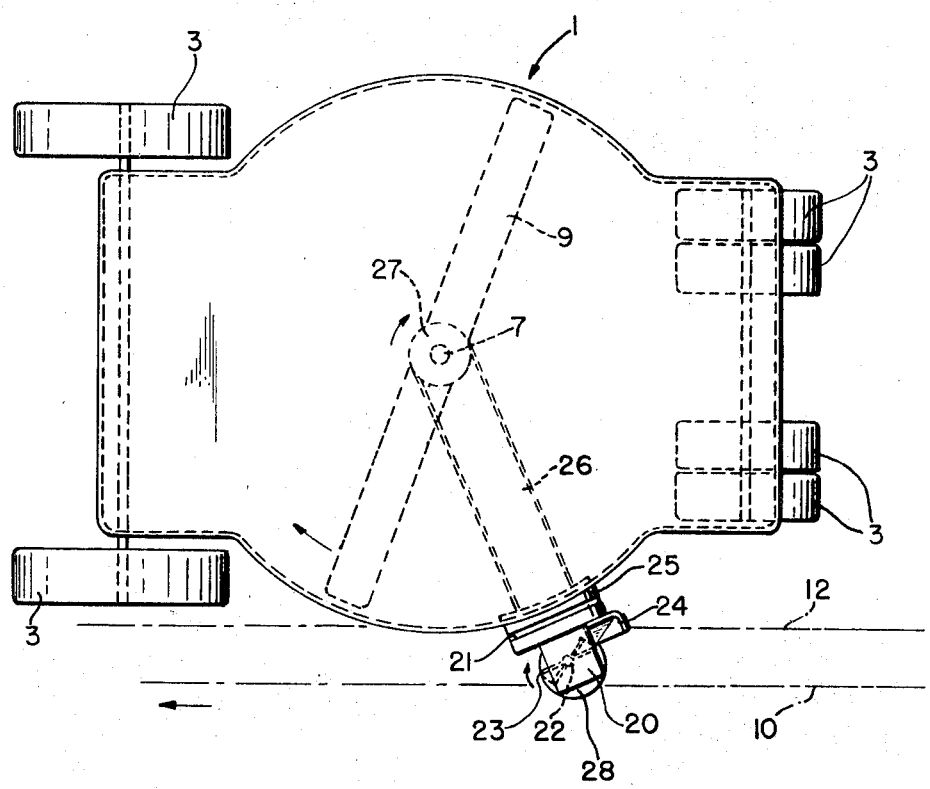
FIG—5
INVENTOR.
JOHN H. STONER
BY Seed, Berry & Downey
ATTORNEYS Patented April 4, 1972
3,653,447
3 Sheets-Sheet 3
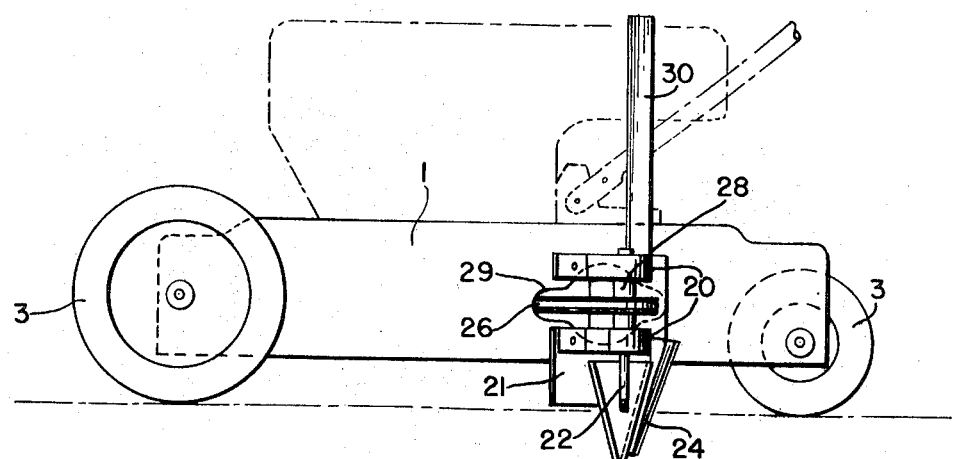
FIG—6
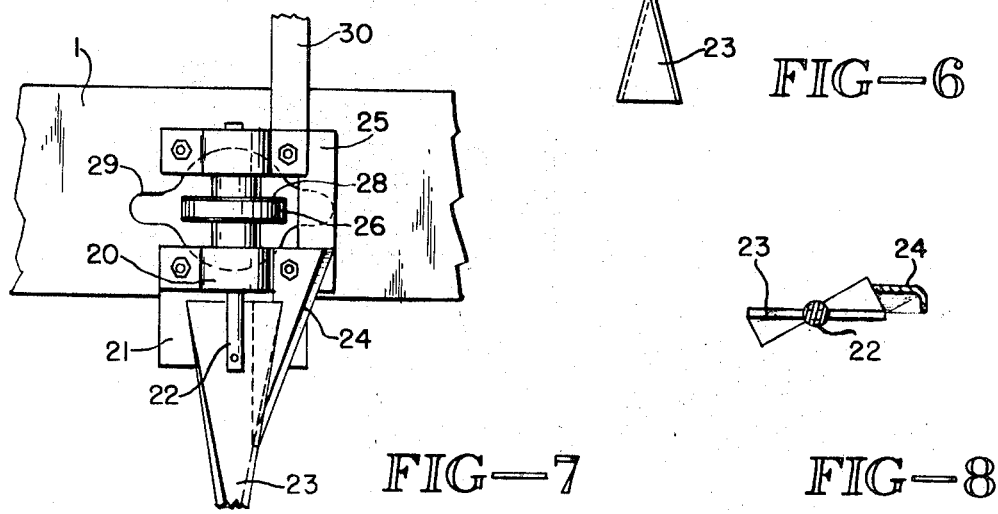
FIG—7
FIG—8
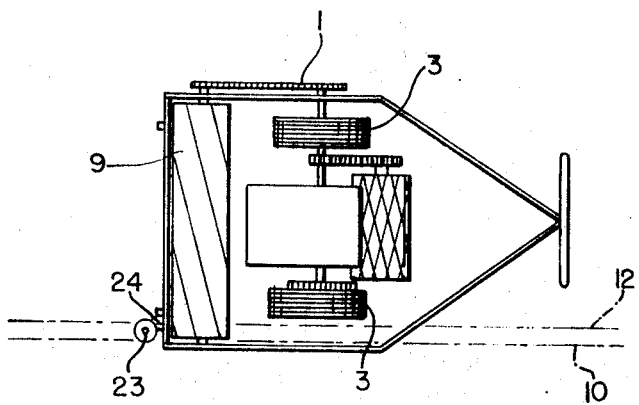
FIG—9
INVENTOR.
JOHN H. STONER
BY
ATTORNEYS

LOW SPEED LAWN EDGER

BACKGROUND OF THE INVENTION

1. Field of the Invention

This invention relates to a power lawn edger.

2. Prior Art Relating to the Disclosure

Lawn edgers available at the present time are usually high speed units which drive a blade in a vertical plane relative to the lawn surface. Even though guards cover the blades the units are potentially dangerous because of the possibility of outwardly projected dirt and rocks. As an alternative to such edgers, rotary edgers turning on a vertical shaft relative to the lawn surface have been proposed. For example, see U.S. Pat. Nos. 2,992,689 to Hartnett and 3,150,720 to Laughlin. Hartnett utilizes an auger as an attachment to the lower end of the drive shaft of a power lawn mower of the rotary type, the length of the auger being sufficient to cut away a narrow strip of sod beneath the mower. Laughlin utilizes a high speed tapered rotary cutter mounted on a vertical shaft to rout out a narrow trench of sod.

SUMMARY OF THE INVENTION

This invention relates to an improved rotary edger which includes a (1) cultivator-edger blade mounted on a substantially vertically oriented shaft, and (2) a shearing bar contacting the cultivator blade. The edger can be used independently or as an attachment to a conventional power lawn mower of the rotary or reel type. When used as an attachment the cultivator edger blade is driven by the motor of the power mower through a belt and pulley system or other suitable drive means. Means are provided for retracting the lawn edger attachment to an inoperative position when it is not needed.

It is a primary object of this invention to provide a power driven lawn edger having a cultivator-edger blade turning on a vertical shaft which cooperates with a normally stationary shearing bar to give a clean vertically sheared lawn edge and a mulched narrow trench.

It is a further object of this invention to provide an improved power driven lawn edger which turns at relatively low RPM and at low power without losing its efficiency, thereby eliminating any danger from outwardly projected rocks or dirt.

It is a further object of this invention to provide a power driven lawn edger integral with a power mower, the power edger retractable from an operative position to an inoperative position.

It is still a further object of this invention to provide a power driven lawn edger having a shearing bar cooperating with a cultivator-edger blade turning on a vertical shaft wherein the shearing bar is spring loaded to prevent jamming thereof by rocks, sticks or pebbles.

BRIEF DESCRIPTION OF THE DRAWINGS

FIG. 1 is a top sectional view of a combination lawn mower of the rotary type and power edger, the power edger retractable vertically from an operative position to an inoperative position;

FIG. 2 is a partial vertical section view through the power edger of FIG. 1 showing in detail the means of vertically retracting the edger;

FIG. 3 is an expanded partial plan view of the edger showing the spring-loaded shearing bar which prevents jamming of the edger by rocks, pebbles, etc.;

FIG. 4 is a perspective view of a power mower of the rotary type including as an attachment the rotary lawn edger of this invention shown in operating position and, in phantom, in retracted position, the edger retractable around a pivot point;

FIG. 5 is a top sectional view of the combination lawn mower and edger of FIG. 4 showing means for driving the blade of the edger;

FIG. 6 is a side elevational view of the combination lawn mower and edger of FIG. 4 showing the edger in greater detail;

FIG. 7 is an expanded view of the power edger of this invention;

FIG. 8 is a sectional view of the cultivator-edger blade and stationary shearing bar of FIG. 7 showing their relationship to each other; and FIG. 9 is a top elevational view of one possible position of the lawn edger of this invention on a reel type mower.

DETAILED DESCRIPTION OF THE INVENTION

A conventional rotary type lawn mower is shown in FIG. 1 with the power edger of this invention mounted on the housing or support frame of the mower as an attachment. The mower includes a housing or support frame 1 mounted on wheels 3 with power means 5 mounted on top of the frame driving a vertical shaft 7 extending through the top of the housing. A rotary mowing blade 9 is attached to the lower end of and is driven by the vertical shaft 7 to cut the grass to the desired height.

The rotary power edger of this invention includes bearing blocks 20 mounted or rigidly secured to mounting plate 21. A substantially vertical shaft 22 is supported by bearings of the bearing blocks. To the lower end of the shaft 22 is welded or otherwise secured a cultivator-edger blade 23. The blade is an elongated piece of metal with a reverse twist designed to force dirt, small rocks or grass into the trench cut by the blade rather than lift it out of the trench, thereby minimizing injection of any dirt or rocks into the mower blade 9.

A normally stationary shearing bar 24 is mounted on the mounting plate 21 so as to contact the edges of the rotating cultivator-edger blade 23 along the length thereof. The shearing bar preferably extends the full length of the blade but may be shortened so as to contact only the upper portion of the edger blade if the edger is to be used where poor soil conditions are encountered. The co-action of the shearing bar with the edger blade is best shown in FIG. 3 and FIG. 7. The cooperation of the edger blade and shearing bar produces a clean, vertically-sheared lawn edge. The shearing bar 24 is preferably pivoted at its upper end to a bracket 32 (FIG. 3) which is bolted to plate 21 so as to swing upwardly and prevent sticks or small stones from jamming between the edger blade and the shearing bar. The shearing bar 24 may be spring-loaded as shown in FIG. 3. A horizontal screw 33, adjustable in length, runs between the lower end of bracket 32 and an L-shaped bracket 34 attached to shearing bar 24. An extended compression spring 35 is carried by screw 33, the ends of the spring resting against bracket 34 and bracket 32. The shearing bar pivots to the right, as shown in FIG. 3, around bolt 36. The lower bolt 37 retains the shearing bar 24 flat against the angle bracket 32. The bolt 37 moves in a slot (not shown) in the angle bracket 32.

The power edger, when used in combination with a lawn mower, is attached to the housing of a conventional mower. As shown in FIGS. 1, 4 and 5 the edger may be mounted on the left side of the housing of a rotary type mower. FIG. 9 illustrates one possible mounting position for the edger on a reel type mower such as the TRIMMER mower manufactured by Trimmer Lawn Mower Company, Los Angeles, California. In either case the edger is usually mounted so that the wheels of the mower are inside the power edger trim line and the reel or rotary blade of the mower is outside of or even with the power edger trim line. As indicated in FIGS. 5 and 9 line 10 represents the edger trim line while line 12 represents the mower trim line. Line 10 may also represent the edge of a sidewalk, driveway or other area being edged. The power edger can be mounted on either side of the power mower although it is shown as being mounted on the left side of the mower.

The power edger is driven by the power means of the lawn mower when used as an attachment or driven independently by an electric motor or small gasoline motor if used independently. When used as an attachment to a lawn mower the edger is suitably driven by the power means of the lawn mower through a belt and pulley system as shown in FIG. 1 or FIG. 5. A belt 26 runs between and is trained around pulley 27 secured to drive shaft 7 of the power mower and pulley 28 secured to shaft 22 of the power edger. The belt runs through an opening in the housing sufficiently large to allow the belt to freely pass therethrough without contacting the edges of the housing. The opening is also made large enough so that the edger can be retracted to an inoperative position without disengagement of the belt.

Other means of driving the edger may be used, such as a chain or gear drive. The belt and pulley system drive is preferred, however.

The power edger is preferably mounted on the housing of the lawn mower so that it can be retracted when not needed. One method of retracting the assembly is by rotating it upwardly approximately 90° as shown in phantom in FIG. 4. To do this mounting plate 21 is attached to support plate 25 (bolted to mower housing) by a pivot pin, bolt or other means, allowing plate 21 and the power edger attached thereto to pivot. For ease of retraction a handle 30 extends from the plate 21. An extension 31 of support plate 25 having a pair of transversely extending ears thereon adapted to hold handle 30 therebetween is provided to lock or clamp the handle and power edger in operating position. The edger can be retracted without disengagement of the belt and pulley system driving the cultivator-edger blade.

A preferred system of retracting the edger is shown in FIGS. 1 to 3 wherein the edger is retracted vertically to an inoperative position. A support plate 38 is bolted to the mower housing, the plate having a flat face which is slanted at a negative angle with respect to a vertical plane parallel to the vertical axis of edger blade 22. The support plate 38 is provided with a pair of vertical guide rails 39 (see FIG. 1) which support and guide plate 21 on which the edger is mounted. Plate 21 rides between rails 39 for vertical movement between an operative position shown by the solid lines of FIG. 2 and an inoperative position shown in phantom in FIG. 2. The degree of slant of the face of mounting plate 38 should be sufficient to release the tension on belt 26 when the edger is in retracted position. An angle of 10° to 15° is sufficient. A retraction handle 40 operatively connected to one end of toggle linkage 41 inside the mower housing raises and lowers the edger assembly on rotation of the handle. The linkage is attached at the opposite end to plate 21 carrying the edger assembly. Linkage 41 and handle 40 are rotatable about pivot point 42. The linkage locks the edger in retracted or fully advanced position. When in retracted position the lower ends of the shearing bar and blade clear the ground at about three-fourths inch. The belt, being loose when the edger is in retracted position, does not drive the cultivator blade.

Means can also be provided for removing the edger from the mower when it is not needed. This can be done by providing a splined or square shaft carrying the cultivator-edger blade which is insertable into a pulley mounted between bearing blocks 20 as described previously, the pulley having a splined or square hole therein for receiving the splined or square shaft carrying the cultivator-blade. A set screw or snap lock provided on the pulley locks and holds the shaft 22 in position. The shearing bar is bolted to the mounting plate.

Variable belt tension devices may also be added to provide an on-off control for the power edger.

In operation the combination mower-power edger is moved to a position for edging and the retracted edger unit advanced until it is in operating position. The unit is then moved slowly forward allowing the power edger to shear the grass and grass roots, dig a narrow trench along the edge of the lawn, and cultivate the soil-grass mixture. The rate at which the edger is moved is dependent on the soil. The power edger is steered by pivoting the entire mower on either the front or rear wheels when using a rotary mower.

If the edge of the lawn has been previously edged and has a previously cultivated trench the power edger may be moved along with the lawn mower at ordinary mowing speed without difficulty. As shown in FIG. 5 the power edger is guided with the left front wheel of the mower running along the edge of the grass shoulder and the power edger trimming the grass and grass roots on the vertical side of the grass shoulder. Sidewalk edging is best done by moving the unit along the grass with the shearing line on the grass side of the trench. Fair results can be obtained by moving the unit along the sidewalk with the shearing bar contacting the sidewalk edge lightly; however, the results are less satisfactory.

Distinct advantages of the power edger of this invention are relatively low speed, the combination of cultivator-edger blade and shear blade, and low power requirement. The edger requires low power because of both low RPM and low torque (due to short blade radius). No more than one-fourth horsepower is required to run the edger of this invention whereas conventional power edgers require several horsepower.

The power edger of this invention can be equally used as an independent unit by mounting a power unit on the frame of the unit and mounting the unit on wheels. The power edger of this invention combines grass trimming and trench cultivation in a safe, simple, low cost apparatus that is easy to maintain, and which can be used with existing power mowers and existing power plants powering the mowers.

The embodiments of the invention in which an exclusive property or privilege is claimed are defined as follows:

1. A low blade-speed rotary lawn edger comprising:
   a frame supported on wheels,
   a drive motor mounted on the frame,
   a shearing bar secured to the frame extending downwardly from the housing below the housing and supporting wheels into the lawn to be edged,
   a substantially vertical rotary blade mounted for rotation with respect to the housing operatively connected to the drive motor and extending downwardly a predetermined distance below the housing and supporting wheels, the outer periphery of the rotary blade adapted to contact the shearing bar along at least a portion of the length of the rotary blade, the coaction of the rotary blade and shearing bar adapted to shear grass, grass roots, and subsoil and the rotary blade being further adapted to cut a narrow trench along the lawn edge and cultivate soil in the trench.

2. The edger of claim 1 wherein the rotary blade is a twisted elongated blade providing a shearing angle against the shearing bar.

3. The edger of claim 2 wherein the rotary blade is rotated relative to the twist direction thereof to force material being cultivated downward, thereby minimizing outward projection of dirt and small rocks.

4. A low blade speed rotary edger attachment for power lawn mowers comprising:
   a mounting plate for the edger,
   means for securing the mounting plate to the housing of a power mower; having a mowing element mounted for rotation within a frame
   a shearing bar secured to the mounting plate and extending downwardly from the frame into the lawn to be edged,
   a substantially vertical rotary cultivator-edger blade mounted for rotation with respect to the frame extending downwardly a predetermined distance below the mowing element of the power mower, the outer periphery of the blade adapted to contact the shearing bar along at least a portion of the length of the cutting blade, the coaction of the rotary blade and shearing bar adapted to shear grass, grass roots and subsoil, and the blade further adapted to cut a narrow trench along the lawn edge and cultivate the soil in the trench; and
   drive means connecting the rotary blade with the power source of the lawn mower.

5. The edger of claim 4 wherein the rotary blade is a twisted elongated blade providing a shearing angle against the shearing bar.

6. The edger of claim 5 wherein the rotary blade is rotated relative to the twist direction thereof to force material being cultivated downwardly, thereby minimizing outward projection of dirt and small rocks.

7. The edger of claim 6 wherein the drive means is a belt and pulley system.

8. The edger of claim 7 including retraction means for retracting the blade and shearing bar to a retracted inoperative position.

9. The edger of claim 8 wherein the mounting plate carrying the edger is adapted to travel vertically and inwardly on parallel rails secured to the housing of the mower to a retracted, inoperative position, and downwardly and outwardly to an operative position.

10. The edger of claim 9 wherein the retraction means includes a toggle linkage connected at one end to the mounting plate and at the other end to a lever, the linkage capable of locking the edger in either the inoperative or operative positions.

11. The edger of claim 8 wherein the retraction means comprises a pivot pin running transversely through the mounting plate carrying the edger and the means securing the mounting plate to the housing, for rotation of the edger about a pivot point from an operative position to a retracted, inoperative position, and means for holding the edger in the operative and retracted inoperative positions.

12. A low blade speed rotary lawn edger for attachment to power lawn mowers having a frame supported on wheels, a grass mowing element mounted for rotation within the frame and power means driving the mowing element, comprising:

a mounting plate carrying the edger, a support plate for securing the mounting plate to the frame of the power mower outside the line of travel of the wheels of the mower but at the edge or inside of the trim line of the mowing element, a shearing bar secured to the mounting plate, the bar extending downwardly below the mowing element into the lawn to be edged, a substantially vertical rotary blade mounted for rotation with respect to the mounting plate and operatively connected to the power means of the lawn mower and extending downwardly a predetermined distance below the mowing element, the rotary blade adapted to contact the shearing bar along at least a portion of the length of the blade, the coaction of the rotary blade and shearing bar adapted to shear grass, grass roots and subsoil, and the blade further adapted to cut a narrow trench and cultivate the soil in the trench, drive means connecting the rotary blade with the power means of the lawn mower; and retraction means for retracting the lawn edger to an inoperative position.

13. The edger of claim 12 wherein the mounting plate carrying the edger is adapted to travel vertically and inwardly on parallel rails integral with the support plate to a retracted, inoperative position, and downwardly and outwardly to an operative position.

14. The edger of claim 13 wherein the retraction means includes a toggle linkage connected at one end to the mounting plate and at the other end to a lever, the linkage capable of locking the edger in either the inoperative or operative positions.

15. The edger of claim 11 wherein the retraction means comprises a pivot pin running transversely through the mounting plate and support plate;

a handle secured to the mounting plate for advancing and retracting the edger about the pivot point; and means for holding the edger in the advanced and retracted positions.

16. The edger of claim 12 wherein the drive means is a belt and pulley system.

17. The edger of claim 12 wherein the shearing bar is spring-biased to prevent jamming of materials between the rotary blade and shearing bar.

* * * * *